UNITED STATES PATENT OFFICE.

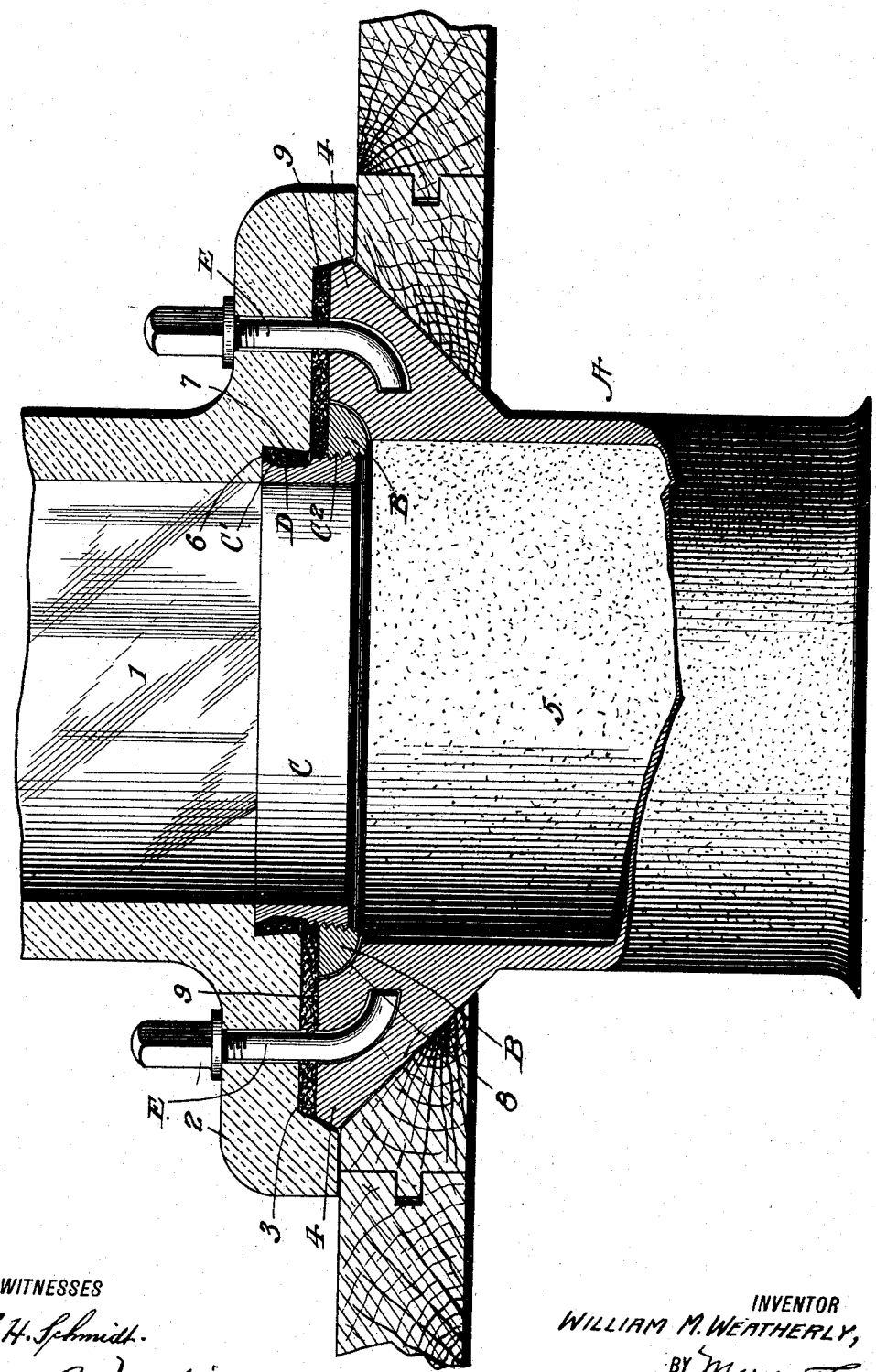

WILLIAM MONROE WEATHERLY, OF GREENSBORO, NORTH CAROLINA.

CLOSET-FITTING.

947,207. Specification of Letters Patent. Patented Jan. 18, 1910.

Application filed February 8, 1909. Serial No. 476,623.

*To all whom it may concern:*

Be it known that I, WILLIAM MONROE WEATHERLY, a citizen of the United States, residing at Greensboro, in the county of Guilford and State of North Carolina, have invented a new and useful Improvement in Closet-Fittings, of which the following is a specification.

This invention is an improvement in closet fittings, and has for an object among others to provide a simple novel construction which will permit the closet to be used, when necessary, when roughed for standard fixtures and will also take standard closets with gasket arrangements, and the invention consists in certain novel constructions and combinations of parts as will be hereinafter described and claimed.

In the drawing the figure is a sectional view of a fitting embodying my invention.

In the construction shown, the neck or tubular portion 1 of the closet which may be of the usual material such as porcelain or earthenware is provided at its lower end with a flange 2 recessed in its lower end at 3 to receive the head 4 at the upper end of the pipe 5.

The lower end of the neck 1 is recessed at its inner side at 6 to receive the packing D and the brass outlet ring C and the outer wall of the recess 6 is slightly undercut at 7 and the opposing portion C′ of the outer side of the ring C is incurved from the upper end of the ring forming a pocket in which the packing D is held and compressed. Threads $C^2$ are formed at the outer side of the ring C at its lower end and receive a nut B which seats, when the parts are assembled as shown in the drawing, in a groove 8 formed in the inner side of the pipe 5 at the upper end thereof. Packing 9 is provided in the recess 3 above the head 4 and the nut and the head and flange 2 are held together by bolts E. These bolts E are not claimed specifically herein but form a part of a separate application for patent filed by me October 22, 1908, Serial No. 459,014.

It will be noticed that the brass outlet C is threaded to take the lock nut B to suit the adjustment in setting the water closet and make a metal joint as shown when the fitting C and lock nut B come together as well as the ordinary gasket joint when necessary. This makes a simple direct metal joint connection for water closets and allows the water closet, when necessary to be used when roughed for standard fixtures, and the fitting will also take standard water closets with gasket arrangements.

The packing between the metallic outlet ring and the neck of the closet operates to interlock the said ring and neck as will be understood from the drawing.

I claim—

1. A pipe or fitting having a head at its upper end and provided at the inner sides of its upper end with a groove, a lock nut seated in said groove, a packing above the head and lock nut, a closet neck having at its lower end a flange overlying the packing over the head and lock nut and the said neck having a recess in its inner side at its lower end, an outlet ring seated at its upper end in said recess and threaded at its lower end on its outer side receiving the lock nut, packing surrounding the upper end of said outlet ring and connections between the closet flange and the head of the fitting substantially as set forth.

2. The combination of a closet tube, an outlet ring fitting at its upper end in the lower end of the said tube and threaded on its outer side at its lower end, a lock nut screwing on the lower end of the ring, a fitting tube and means independent of the outlet ring for securing the fitting tube to the closet substantially as set forth.

3. The combination of a closet tube recessed in its lower end at its inner side, an outlet ring arranged at its upper end in said recess and having its lower end threaded on its outer side, a lock nut screwed on said threaded end of the outlet ring, a fitting tube recessed in its upper end for the reception of said lock nut and packing and connecting devices substantially as set forth.

4. The combination of a fitting having a head at its upper end and grooved in the inner edge of said head, a closet tube having at its lower end a flange overlying the head of the fitting and provided in said lower end with a recess, means securing the head of the fitting to the flange of the closet tube, an outlet ring fitting at its upper end in the recess in the closet tube, packing, and a lock nut operating upon the packing, said nut being threaded upon the outerside of the outlet ring and seating in the recess in the upper end of the fitting all substantially as set forth.

WILLIAM MONROE WEATHERLY.

Witnesses:
  THOS. C. HOYLE,
  HOWARD GARDNER.